March 30, 1937. R. E. J. GARRETSON 2,075,110
EXTENSIBLE STEERING WHEEL POST
Filed March 19, 1935
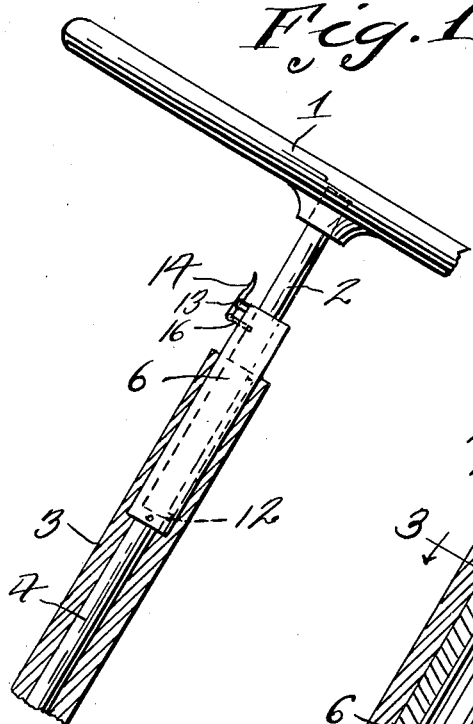
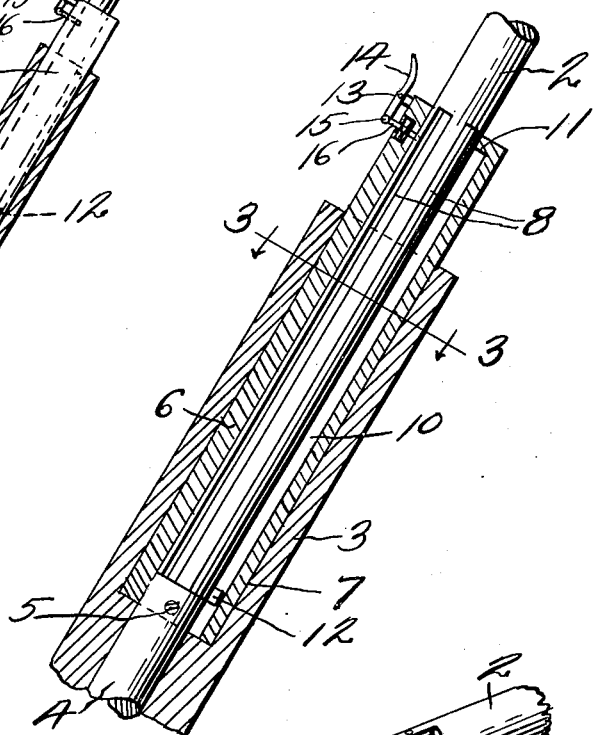
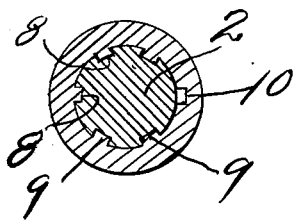
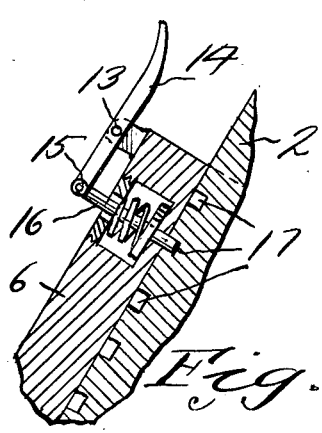
Inventor
R. E. J. Garretson
Attorney Patented Mar. 30, 1937

2,075,110

UNITED STATES PATENT OFFICE 2,075,110

EXTENSIBLE STEERING WHEEL POST

Richard E. J. Garretson, Gering, Nebr., assignor of one-half to Eugene S. Starrett, Hartville, Wyo.

Application March 19, 1935, Serial No. 11,862

1 Claim. (Cl. 74—493)

The invention relates to extensible steering posts for motor driven vehicles which may be easily extended or shortened to adjust the wheel in relation to the seat of the automobile, the height of the operator or to an extreme shortening position to allow easy access to the seat, particularly where the operator is unusually large.

A further object is to provide the steering post within the casing with a sleeve in which is slidably mounted and connected an extensible shaft carrying the steering wheel and means within reach of the operator for holding the steering post in various extended or collapsed positions.

A further object is to provide a rib and groove connection between the extensible portions of the steering post and the sleeve.

A further object is to provide the lower end of the extensible portion of the post with a lug slidably mounted in a groove in the inner periphery of the sleeve and cooperating with the upper end of the groove for limiting purposes.

A further object is to provide the upper end of the sleeve with a spring actuated detent within easy reach of the operator and cooperating with a plurality of apertures in the extensible portion of the post for holding the same in adjusted position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Fig. 1 is a view in side elevation of the device, showing the casing in vertical longitudinal cross section.

Figure 2 is a vertical longitudinal sectional view through the upper end of the steering column casing and the sleeve.

Figure 3 is a horizontal sectional view taken on line 3—3 of Figure 2.

Figure 4 is a detail sectional view through the detent means, a portion of the steering wheel carried portion of the post and the sleeve.

Figure 5 is a perspective view of the extension portion of the post.

Referring to the drawing the numeral 1 designates a conventional form of steering wheel of the kind used in connection with motor driven vehicles, and 2 the extensible portion of the steering shaft. Rotatably mounted within the steering post casing 3 is the lower portion 4 of the steering post shaft and which portion is held against axial movement within the casing 3 in the usual manner. Secured to the upper end of the portion 4 of the shaft, for instance by means of a pin 5, is a rotatable sleeve 6, rotatably mounted within a counterbore 7 of the casing 3, as clearly shown in Figures 1 and 2. If desired the upper end of the portion 4 may be secured to the sleeve in any suitable manner, and it is to be understood that the pin 5 is shown for purposes of illustration only.

The lower portion of the extension shaft 2 is provided with a plurality of longitudinally disposed grooves 8, in which are received and slidably mounted, the longitudinally disposed ribs 9 carried by the inner periphery of the sleeve 6, therefore it will be seen that when the extension portion 2 of the shaft is rotated the sleeve 6 will rotate therewith as well as the portion 4 of the shaft within the casing 3 for steering purposes. By providing the rib and groove connection, it is obvious that not only a positive connection is formed between the extension shaft 2 and the sleeve, but also a slidable one, thereby insuring a positive connection. The inner periphery of the sleeve 6 is provided with a longitudinally disposed groove 10 extending inwardly from the lower end thereof and terminating adjacent the upper end thereof to form a shoulder 11 against which the stop lug 12 engages to limit the upward slidable connection between the shaft section 2 and the sleeve and to prevent complete disengagement thereof.

By extending the groove 10 inwardly from the extreme lower end of the sleeve 6, it will be noted that the shaft section 2 may be axially assembled within the sleeve and at the same time the upper end of the shaft section 4 may be utilized as a closure for the lower end of the chamber of the sleeve 6 and as a limiting means for the inward movement of the shaft section 2. In assembling the device the hand wheel 1 is removed from the shaft 2 and the sleeve 6 is then telescopically placed over the upper end of the shaft 2 until the lug 12 carried by the shaft 2 is received in the groove 10. After this operation the upper end of the shaft 4 is pinned by the pin 5 within the lower end of the sleeve 6. Following the above operation the shaft 4 is then passed downwardly through the steering post casing 3 for receiving at its lower end a conventional steering gear connection to the wheel. It will be noted that when a stout person gets in the automobile seat, the wheel 1 may be easily lowered to a position out of the way of the knees of the operator and then properly adjusted after the operator is seated. The same is true when the operator leaves the automobile. The device has additional function, as it can be adjusted as to height to suit the operator, and in relation to the seat for a further adjustment.

Rockably mounted at 13 on the upper end of the sleeve 6 is a lever 14, one end of which has pivotally connected at 15 thereto a spring actuated detent 16, the inner end of which is adapted to be received in any of the series of apertures 17 in the side of the extension shaft 2 for holding said extension shaft in various adjusted positions. It will be noted that the detent means is within easy reach of the operator at all times, thereby allowing a quick adjustment of the device.

From the above it will be seen that an adjustable steering post and wheel is provided which is simple in construction, the parts reduced to a minimum, and one which may be cheaply manufactured and sold.

The invention having been set forth what is claimed as new and useful is:

An extensible steering post comprising a stationary casing having a cylindrical chamber in the upper end thereof and a cylindrical bearing chamber extending downwardly from the lower end of the upper chamber and of smaller diameter than the upper chamber, a lower shaft section rotatably mounted in the lower bearing chamber and extending upwardly into the upper chamber, a sleeve rotatably mounted in the upper chamber and of greater outside diameter than the lower shaft section, said lower shaft section being anchored in the lower end of the sleeve, the upper end of the sleeve terminating above the casing, an upper shaft section, longitudinal rib and groove connections between the inner periphery of the sleeve and the upper shaft section and extending entirely around the upper shaft section, said upper shaft section when in lower position having a bearing against the lower shaft section, a rib and groove stop connection between the sleeve and upper shaft section for limiting the upward movement thereof, a spring actuated detent carried by the sleeve above the casing, said spring actuated detent cooperating with alined apertures in one of the ribs of the upper shaft section for holding the upper shaft section in adjusted positions.

RICHARD E. J. GARRETSON.